United States Patent [19]

Ansel

[11] Patent Number: 4,607,068
[45] Date of Patent: Aug. 19, 1986

[54] RADIATION-CURABLE COATINGS ADAPTED FOR MAGNETIC RECORDING STRUCTURES

[75] Inventor: Robert E. Ansel, Hoffman Estates, Ill.

[73] Assignee: DeSoto, Inc., Des Plaines, Ill.

[21] Appl. No.: 740,390

[22] Filed: Jun. 3, 1985

[51] Int. Cl.[4] ............................................. C08G 18/44
[52] U.S. Cl. ................................ 523/181; 252/62.51;
252/62.54; 524/101; 524/401; 524/431;
524/720; 524/785; 526/261; 528/61; 528/76;
558/266
[58] Field of Search ................ 523/181; 524/101, 401,
524/431, 720, 785; 528/49, 61, 76; 260/463;
526/261; 252/62.51, 62.54

[56] References Cited

U.S. PATENT DOCUMENTS 4,246,316 1/1981 Aonuma et al. ...................... 428/329
4,256,852 3/1981 Naruse et al. ........................ 523/181
4,263,366 4/1981 Lorenz et al. ................... 204/159.23

OTHER PUBLICATIONS

Cas Online AN-76-06166x/04, Abstract of Japanese 50-77433, Jun. 1975.

Primary Examiner—Maurice J. Welsh
Attorney, Agent, or Firm—Dressler, Goldsmith, Shore, Sutker & Milnamow, Ltd.

[57] ABSTRACT

Radiation curable coating compositions, and especially electron beam-curable coating compositions, are disclosed in which magnetizable particles are dispersed in a liquid vehicle comprising a polyethylenically unsaturated polyurethane oligomer which includes a polycarbonate diol, and from 5% to 50%, based on the total weight of unsaturated material, of a polyethylenically unsaturated isocyanurate, such as a triacrylate of tris(2-hydroxyethyl) isocyanurate.

24 Claims, No Drawings

RADIATION-CURABLE COATINGS ADAPTED FOR MAGNETIC RECORDING STRUCTURES

DESCRIPTION

1. Field of Invention

This invention relates to coating compositions which are curable with radiation, and especially with electron beam radiation, to enable the rapid production of cured pigmented coatings, especially magnetic recording structures, such as tapes or disks, in which a layer of magnetizable particles is dispersed in a solidified thermoset coating vehicle on a nonmagnetizable substrate.

2. Background Art

The production of magnetic recording structures, such as tapes and disks, is known. In these known processes, a liquid coating composition which has been pigmented with particles having the capacity to retain a magnetic orientation, referred to hereinafter as magnetizable particles, is applied to an appropriate nonmagnetizable substrate. The pigmented coating is then baked to solidify the coating and fix the magnetizable particles in place within the coating.

In the known processes, the magnetizable particles are used in admixture with a nonmagnetizable binder (which may be thermoplastic or theremosetting) and a volatile solvent is present to dissolve the binder and provide a solvent solution which is applied as a thin coating upon the substrate. The coated substrate is then force dried to remove the solvent. Some reactive binders are cured with polyisocyanates by prolonged storage in a hot room, e.g., at 140° F. An illustrative process is shown in U.S. Pat. No. 4,246,316.

Unfortunately, the known processes are slow, and the cure used may lack desired uniformity. Also, when isocyanate-functional materials are used, these have a limited pot life and are hard to work with. It is desired to employ electron beam radiation to rapidly cure a polyethylenically unsaturated coating liquid on the nonmagnetizable substrate, but the cured coatings produced in this fashion lack the physical toughness needed to provide a good product. In this connection, reference is made to Japanese Application No. 48-126778 which was laid open June 24, 1975 under No. 50-77433.

It should be appreciated that the electron beam curing process does provide many advantages, such as the use of stable coatings, greater speed of production, more uniform product quality, more compact equipment, and, per this invention, products of greater durability in which the magnetic pigment is more easily and uniformly distributed.

In my prior application Ser. No. 528,044 filed Aug. 31, 1983, and now abandoned, I disclosed coating compositions which can be pigmented with magnetizable particles and applied and cured with electron beam radiation to provide magnetic recording media. However, it has been difficult to get high quality radiation-cured magnetic recording structures, and those obtained herein have been found to be superior, providing better tape stiffness and better magnetic characteristics. This invention is thus addressed to the problem of providing improved radiation curable coating compositions which are hard and tough, and which cure to provide a superior combination of needed characteristics so as to make radiation-cured coatings more practical in the formulation of acceptable coatings for magnetic recording media.

DISCLOSURE OF INVENTION

In accordance with this invention, liquid radiation-curable coating compositions adapted to be pigmented and cured by exposure to electron beam radiation include a liquid medium comprising a polyethylenically unsaturated polyurethane oligomer which includes a polycarbonate diol, and from 5% to 50%, based on the total weight of unsaturated material, of a triethylenically unsaturated isocyanurate. The oligomer may include reactive groups which aid pigment wetting, such as hydroxyl or carboxyl groups, or extraneous agents which aid pigment wetting may be incorporated in the coating composition, as will be discussed. The pigment may be dispersed in the liquid medium at any time.

The essential component of the polyethylenically unsaturated polyurethane oligomer, is a polycarbonate diol having the formula set forth hereinafter. This diol is reacted with an organic diisocyanate, optionally an amine or hydroxy-functional extending agent, and a monohydric ethylenically unsaturated compound.

The order of reaction of these components is secondary, it being possible to prereact all the components except the unsaturated compound to provide an isocyanate-terminated oligomer which is reacted with the monohydric unsaturated compound. One may also have all the components present at the same time. In preferred practice, the monohydric ethylenically unsaturated compound is pre-reacted with a diisocyanate (which may be formed by reacting excess diisocyanate with the polycarbonate diol and/or some of the extending agents) to form an unsaturated oligomeric monoisocyanate, and this monoisocyanate is then reacted with extending agent or polycarbonate diol to form the polyethylenically unsaturated oligomer.

The ethylenic group is preferably an acrylate group, and acrylates will be referred to for convenience, even though these are less desirably replaced by other monoethylenic groups, as hereinafter discussed.

Diisocyanates that can be used to produce the oligomers of this invention are preferably aliphatic and cycloaliphatic diisocyanates that will react with terminal hydroxyl groups. Aromatic diisocyanates, such as toluene diisocyanate, undergo the same reaction as aliphatic diisocyanates, and yield stiffer products which are still useful.

Examples of suitable diisocyanates include among others, isophorone diisocyanate, 4,4'-dicyclohexylmethane diisocyanate available commercially from Mobay Chemical Corporation, Pittsburgh, Pa., under the tradename "Desmodur W", and trimethyl-hexamethylene diisocyanate, 1,6-hexamethylene diisocyanate, 2,4,4-triethyl 1,6-hexylene diisocyanate, octadecylene diisocyanate and 1,4-cyclohexylene diisocyanate. The preferred diisocyanates are isophorone diisocyanate (3-isocyanatomethyl-3,5,5-trimethylcyclohexyl isocyanate) and 4,4'-dicyclohexylmethane diisocyanate.

The diisocyanates are reacted with the other polyfunctional materials described herein to provide oligomers, and excess diisocyanate provides isocyanate functionality which is capped with the monohydric ethylenically unsaturated compound. All sorts of polyether diols, polyester diols, diprimary amines and even dimercaptans may be used to provide difunctional materials which may optionally be used to form the oligomers of this invention. Polyether diols are illustrated by polyoxypropylene glycols and polyoxytetramethylene glycols having a molecular weight of from about 200 to about 4,000, e.g. about 600. Polyester diols can have the same molecular weight as the polyether diols and can be made by the reaction of excess 1,4-butane diol with succinic acid, adipic acid, or their anhydrides, dimercaptans are illustrated by 1,6-dithiol hexane, and caprolactone polyols. The diprimary amines are illustrated by polyoxypropylene diamine having a molecular weight of 230.

The polytetramethylene glycols are available from the Du Pont Company (Wilmington, Del.) under the tradenames "Teracol-650", "Teracol-1000", and "Teracol-2000". In the above-named tradenames, the number indicates the approximate molecular weight of the polytetramethylene glycol, the most preferred molecular weight being about 650.

The caprolactone polyols are commercially availabe from Union Carbide Corporation (Danbury, Conn.). These were available under the tradenames "Niax Caprolactone Polyols"-PCP-0200, PCP-0210, PCP-0230, PCP-0240, PCP-0301, PCP-0305 and PCP-0310. The 0200 series are diols with moleclar weight 530, 830, 1250 and 2000 respectively. The 0300 series are triols with molecular weights of about 300, 540 and 900, respectively. These same products have been renamed and are now available as "Tone Polyols" having the same numbers noted above, e.g., Tone 0200 Polyol.

Suitable diprimary amines are available from Texaco, Inc., Houston, Tex.

The term "polyacrylate" is here used to denote plurality of acrylic acid ester groups, and this is one accepted use of this term. Also, the term "oligomer" is a common one, and denotes relatively low molecular weight polymers having a small number of units, e.g., from about 2 to about 100. Some of the higher molecular weight products contemplated herein may not be considered by some to be oligomeric. Further, molecular weights herein are by calculation from the measured functionality, unless otherwise stated.

The oligomeric unsaturated monoisocyanate discussed previously, permissibly in admixture with unreacted diisocyanate, can be reacted with enough extending or linking agent to consume the isocyanate groups which are present. When the extending agent is difunctional, as when one uses a dihydric alcohol or a diamine as previously illustrated, the oligomer which is formed will not contain any reactive groups. In such instance it would be preferred to include an extraneous agent to assist pigment wetting, as will be discussed later.

It is also possible to include the desired pigment wetting characteristics in the unsaturated oligomer by employing an at least trifunctional extending agent in the preferred procedure under consideration, and stoichiometry or other factors which will cause one or more reactive groups to remain in the unsaturated oligomeric product to provide the desired wetting characteristic.

One way of doing this is to provide unreacted hydroxyl groups in the unsaturated oligomer. This can be accomplished using an at least trifunctional polyol or amino alcohol linking compound containing at least one hydroxyl group and sufficient hydroxyl and/or amino hydrogen functionality to react with all of the isocyanate functionality present to form an unsaturated polyurethane while leaving only unreacted hydroxyl groups, preferably at least one equivalent of hydroxyl per mole of polyol or amino polyol used.

The at least trifunctional polyol or amino alcohol linking compound preferably has a molecular weight of less than 600, such as glycerin. Other linking compounds which may be used are illustrated by trimethylol propane. Higher functional compounds may also be used, such as pentaerythritol and polyepoxides which have been reacted with a compound which consumes the epoxy groups and adds secondary hydroxyl groups. These may be carboxylic acids, like acetic acid, which form hydroxy esters, or alcohols, like butanol, which form hydroxy ethers, or amines which form amino alcohols.

Amino alcohols are also useful, such as monoethanol amine which can be used after reaction with 0.5 molar proportion of ethylene dichloride or ethylene glycol diacrylate. Diethanol amine is useful, the secondary amino hydrogen atom and one of the two hydroxy groups reacting with the isocyanate groups.

Another preferred way of doing this is to provide unreacted carboxyl groups in the unsaturated oligomer. This can be accomplished by using an at least trifunctional compound containing at least one carboxyl and sufficient hydroxyl and/or amino hydrogen functionality to react with all of the isocyanate functionality present to form an unsaturated polyurethane while leaving only unreacted carboxyl groups. It is preferred to leave at least one equivalent of carboxyl per mole of linking compound used. These carboxyl-functional linking compounds are illustrated by dimethylol propionic acid and N,N-bis(2-hydroxyethyl)glycine.

It is essential in accordance with this invention to use a polycarbonate diol which has the formula:

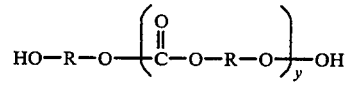

in which R is the residue of an alkylene diol containing 2-12 carbon atoms, such as 1,4-butane diol or 1,6-hexane diol; y is at least 1, and R and y are selected to provide a molecular weight for the polycarbonate diol of from 300 to 3000, preferably from 600 to 1500.

It is desired to point out that the polycarbonate diols, and also polyurethanes made therefrom by reaction with diisocyanates, are themselves known compounds, as illustrated in U.S. Pat. No. 4,264,752.

The reaction of the isocyanate-terminated oligomer with the hydroxyl functional monoethylenically unsaturated monomer is itself well known. Similarly, the reaction of isocyanate functionality with the amine and/or hydroxyl groups of the polyol or amino alcohol compound involves conventional reactions which are illustrated in the examples using typical catalysts where appropriate.

The polyurethane oligomers of this invention are terminated with ethylenically unsaturated groups, preferably with acrylate groups. This is done by using 2-hydroxyethyl acrylate, or other ethylenically unsaturated monomer having a single hydroxyl group, like 2-hydroxyethyl methacrylate, 2-hydroxypropyl acrylate, 2-hydroxybutyl acrylate, or the corresponding itaconates. While the acrylate group is preferred, any ethylenic group which cures when appropriately exposed to radiation can be used, as has been illustrated. Polyethylenically unsaturated monohydric alcohols are also useful such as pentaerythritol triacrylate. The result is an oligomeric polyethylenically unsaturated polyurethane oligomer which includes a polycarbonate diol.

Another way of enabling the coating compositions of this invention to better wet the pigment is by incorporating a small proportion, typically from 0.1% to 5% of the total weight of polymerizable material, of a pigment dispersant. Some of these are known, but it is preferred to use polymerizable dispersants. These may be half amides or half esters of an ethylenically unsaturated polycarboxylic acid anhydride, such as maleic anhydride, with an organic compound having a molecular weight of from 100 to 4000 and which contains a single hydroxy group or a single amino group as the sole reactive group thereof, as disclosed in my prior U.S. Pat. No. 4,496,686.

The polyethylenically unsaturated oligomers which have been described are used in this invention in combination with a polyethylenically unsaturated isocyanurate compound, preferably a triacrylate, obtained by reacting about 3 moles of acrylic, methacrylic, or similar unsaturated acid, with a trihydric isocyanurate, such as 2-hydroxyethyl isocyanurte, or 2-hydroxypropyl isocyanurate. This forms esters, but the linking group is of secondary significance. Thus, while the ester linkage is preferred, one can use an N-alklyol compound, such as N-methylol acrylamide, or an unsaturated monohydric alcohol, such as 2-hydroxyethyl acrylate, and form an ether-type linkage. One may also employ a monoisocyanate-functional unsaturated compound, preferably formed by reacting one mole of a monohydric acrylate, such as 2-hydroxyethyl acrylate, with one mol of organic diisocyanate, illustrated by isophorone diisocyanate. Tris-2-hydroxyethyl isocyanurate triacrylate is a particularly useful polyacrylate. Another particularly useful polyacrylate is tris-2-hydroxyethyl isocyanurate reacted with three molar proportions of a monoisocyanate formed by reacting equimolar proportions of a diisocyanate, like isophorone diisocyanate, and 2-hydroxyethyl acrylate.

Triacrylates are particularly contemplated, but one can broadly employ isocyanurates which carry an average of from about 2.0 to about 3.0 acrylate groups per molecule, preferably from 2.6 to 3.0.

It is preferred that the polyethylenically unsaturated oligomer constitute at least about 30% up to about 95% of the total polymerizable material in the coating composition, more preferably at least about 50%. The isocyanurate triacrylate will desirably be present in an amount of from 5% to about 50% of total polymerizable material, preferably in an amount of at least 20%, and there will be enough liquid component to provide coating viscosity.

Coating compositions are preferably provided containing magnetizable particles dispersed in a liquid vehicle comprising the unsaturated oligomer and triethylenic isocyanurate. The liquid vehicle requires an appropriate viscosity for coating application, and it is thus important that one also have present a proportion of some liquid component which may be monoethylenic, polyethylenic, or a volatile nonreactive solvent. Typical further unsaturated liquids which may be present are dimethyl acrylamide, and pentaerythritol triacrylate.

The volatile solvents which may be used are subject to wide variation. Thus, aromatic solvents, such as toluene, cycloaliphtic solvents, such as cyclohexanone, and heterocyclic solvents, such as tetrahydrofuran, are all useful herein and will be illustrated hereinafter.

Based on 100 parts of nonvolatile solids (which includes reactive volatile components) in the pigmented coating composition, it is preferred to employ from 50 to 400 parts of volatile solvent, peferably from 100 to 300 parts. These solvents are removed, preferably by vaporization, at room or slightly elevated temperature, prior to curing. Even when liquid ethylenic or polyethylenic components are present, it is desirable to have some volatile nonreactive solvent present as well so as to minimize the proportion of other liquids required to provide a liquid coating composition of coating viscosity.

This liquid coating composition is preferably pigmented with magnetizable particles and applied as a wet film on a nonmagnetizable substrate, such as polyethylene terephtalate film. If the coating composition contains a volatile nonreactive solvent, this solvent is vaporized away at room or slightly elevated temperature. The coating, wet or dry and at room or elevated temperature, is then exposed to electron beam radiation to produce a solid thermoset coating having magnetizable particles dispersed therein.

The pigmentation of the coatings with magnetizable particles in accordance with this invention will provide dispersions having from 50% to 85% by weight of pigment particles based on the total weight of the cured coating. It is convenient to apply coating compositions having from 25% to 50% of total nonvolatile solids.

The coatings of this invention possess superior toughness enabling magnetic recording structures of good quality to be rapidly produced.

When the uncured coating is a solid film, as can be obtained herein by using a proportion of volatile organic solvent which is removed by volatilization before the deposited coating is cured, it can be calendered or otherwise mechanically worked prior to electron beam curing exposure.

Appropriate magnetizable particles are illustrated in the patent referred to previously and also in the examples herein. These are well known and are the same in this invention as in the art.

While magnetizable particles and electron beam curing are preferred, one may use pigments to merely provide opacity or coloration, and when the pigmentation is not excessive, one can incorporate photoinitiators, like benzophenone, and sensitizers, like diethyl amine, as is well known, and cure with ultraviolet light. This is not preferred because the pigments absorb ultraviolet light.

In this application, all proportions are by weight, unless otherwise stated, and the invention is illustrated in the examples which follow.

EXAMPLE 1

There were charged to a 250 ml three neck round bottom flask equipped with a thermometer, distilling column, heating mantle, magnetic stirrer, distilling head, air condenser, receiver and vacuum attachments, 45 grams of 1,4-butanedoil, 96.3 grams of diphenyl carbonate and 0.1 gram of sodium hydroxide. The flask was evacuated to a pressure of about 10 mm Hg and the mixture was stirred and heated to about 100° C. and kept at these conditions for about three hours during which slow phenol distillation was observed. After three hours the pressure was reduced to 1 mm Hg and the temperature raised to 120° C. for 1 hour to complete the phenol distillation. After 1 hour the residue was cooled to room temperature and acetic acid was added dropwise until the mixture was neturalized. A distillate of 84.6 grams of phenol and a residue of 54.4 grams (96% of theoretical yield) of a polymeric carbonate diol having a number average molecular weight of 1134 was recovered.

The polycarbonate produced above is a linear polymer having one hydroxyl group at each end thereof, so it is a polycarbonate diol.

EXAMPLE 2

Charge a suitable reactor with 118 grams of tetrahydrofuran and 105.6 grams (0.4 moles) of 4,4'-methylenebis(cyclohexylisocyanate) (the Mobay product Desmodur W may be used) and 0.29 grams of dibutyltin dilaurate catalyst. To the solution in the reactor is added a separately formed solution of 214 grams of tetrahydrofuran and 226.8 grams (0.2 moles) of the polycarbonate diol of Example 1 (PPG Industries, Pittsburgh, PA product Duracarb Diol 122 having a number average molecular weight of about 1000 may be used). The reaction is exothermic, so addition is made slowly with stirring to limit the temperature to 60° C. Stirring is continued for 1 hour after addition is complete, and the product is allowed to cool to 35° C.

0.19 gram of phenothiazine is premixed with 9.3 grams (0.08 mole) of 2-hydroxyethyl acrylate, and the mixture is slowly added with stirring to the product in the reactor to limit the temperature caused by the exothermic reaction to 50° C. Stirring is continued for one half hour after addition is complete. There is then added with stirring a solution of 36.0 grams of tetrahydrofuran and 36.0 grams of polyoxypropylene diamine having a molecular weight of about 225 (Jeffamine D230 a product of Texaco Chemical Co., Houston, TX may be used) Addition is slow to limit the temperature rise to 60° C., and stirring is continued until the isocyanate level is less than 0.1%. The product is adjusted to 50% solids content by the addition of tetrahydrofuran.

EXAMPLE 3

Charge a suitable blending vessel with 108.3 grams of tetrahydrofuran, 700 grams of the 50% resin solution of Example 2 and 233.3 grams of tris(2-hydroxyethyl)isocyanurate triacrylate. This mixture is stirred until it is completely homogeneous.

EXAMPLE 4

In a pint can, 45 grams of cobalt-modified iron oxide are blended with 0.9 grams of the phosphate ester of phosphoric acid with an octyl phenol ethoxylate containing 10 mols of ethylene oxide per mol of the phenol as dispersant, and 1.6 grams of the product of Example 3. 52.75 grams of cyclohexanone are added along with 45 ml. of stainless steel shot. The mixture is shaken on a Red Devil Paint Conditioner for 3 hours. Then, 16.9 grams of the product of Example 3 are added and shaking is continued for an additional half hour, whereafter the shot is removed and the resulting pigmented coating is applied onto a Mylar support and exposed to an electron beam to cure the same. The cured film was hard and glossy and the coated Mylar was determined to have excellent properties for use as a magnetic recording tape.

What is claimed is:

1. An electron beam-curable coating composition comprising a liquid medium comprising a polyethylenically unsaturated polyurethane oligomer which includes a polycarbonate diol, and from 5% to 50%, based on the total weight of unsaturated material, of a polyethylenically unsaturated isocyanurate.

2. A coating composition as recited in claim 1 in which said oligomer includes reactive hydroxyl or carboxyl groups to aid pigment wetting.

3. A coating composition as recited in claim 1 in which magnetizable pigment is dispersed in said liquid medium.

4. A coating composition as recited in claim 3 in which said composition includes extraneous agents to aid pigment wetting.

5. A coating composition as recited in claim 1 in which said polyethylenically unsaturated polyurethane oligomer comprises the reaction product of a polycarbonate diol having the formula:

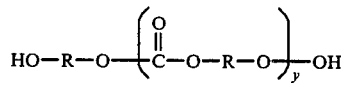

in which R is the residue of an alkylene diol containing 2-12 carbon atoms; y is at least 1, and R and y are selected to provide a molecular weight for the polycarbonate diol of from 300 to 3000, with an organic diisocyanate, an amine or hydroxy-functional extending agent, and monohydric ethylenically unsaturated compound.

6. A coating composition as recited in claim 5 in which said monohydric ethylenically unsaturated compound is an hydroxy-functional acrylate.

7. A coating composition as recited in claim 6 in which R and y are selected to provide a molecular weight for the polycarbonate diol of from 600 to 1500.

8. A coating composition as recited in claim 6 in which said extending agent is glycerin.

9. A coating composition as recited in claim 6 in which said extending agent is monoethanol amine.

10. A coating composition as recited in claim 6 in which said extending agent is dimethylol propionic acid.

11. A coating composition as recited in claim 6 in which said extending agent is N,N-bis(2-hydroxyethyl)glycine.

12. A coating composition as recited in claim 1 in which said polyurethane oligomer contains urea groups.

13. A coating composition as recited in claim 1 in which said polyethylenically unsaturated polyurethane oligomer constitutes at least about 30% up to about 95% of the total polymerizable material in said coating composition.

14. A coating composition as recited in claim 13 in which the proportion of said polyethylenically unsaturated polyurethane oligomer is at least about 50%, and said polyethylenically unsaturated isocyanurate is present in an amount of at least 20%, there being enough liquid present to provide coating viscosity.

15. A coating composition as recited in claim 14 in which said polyethylenically unsaturated isocyanurate is a derivative of tris(2-hydroxyethyl)isocyanurate.

16. A coating composition as recited in claim 15 in which said polyethylenically unsaturated isocyanurate is a polyacrylate containing from about 2.0 to about 3.0 acrylate groups per molecule.

17. A coating composition as recited in claim 16 in which said polyacrylate contains from 2.6 to 3.0 acrylate groups per molecule.

18. A coating composition as recited in claim 17 in which said polyacrylate is a triacrylate ester of tris(2-hydroxyethyl)isocyanurate.

19. A coating composition as recited in claim 14 in which said composition is pigmented with magnetizable particles.

20. A coating composition as recited in claim 19 in which said magnetizable particles are present in an amount of from 50% to 85% by weight based on the total weight of the coating formed by removal of volatiles, and said composition contains from 25% to 50% of total nonvolatile solids, balance volatile organic solvent.

21. An electron beam-curable coating composition comprising a liquid medium comprising a polyethylenically unsaturated polyurethane oligomer containing urea groups which comprises the reaction product of a polycarbonate diol having the formula:

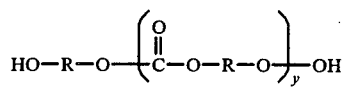

in which R is the residue of an alkylene diol containing 2-12 carbon atoms; y is at least 1, and R and y are selected to provide a molecular weight for the polycarbonate diol of from 300 to 3000, an oxypropylene diamine, an organic diisocyanate, and a monohydric ethylenically unsturated compound.

22. A coating composition as recited in claim 21 in which R and y are selected to provide a molecular weight for the polycarbonate diol of from 600 to 1500.

23. A coating composition as recited in claim 22 in which said composition is pigmented with magnetizable particles.

24. A coating composition as recited in claim 22 in which said magnetizable particles are present in an amount of from 50% to 85% by weight based on the total weight of the coating formed by removal of volatiles, and said composition contains from 25% to 50% of total nonvolatile solids, balance volatile organic solvent.

* * * * *